US005629872A

United States Patent [19]
Gross et al.

[11] Patent Number: 5,629,872
[45] Date of Patent: *May 13, 1997

[54] SYSTEM FOR MONITORING AN INDUSTRIAL PROCESS AND DETERMINING SENSOR STATUS

[75] Inventors: Kenneth C. Gross, Bolingbrook; Kristin K. Hoyer, Chicago, both of Ill.; Keith E. Humenik, Columbia, Md.

[73] Assignee: ARCH Development Corporation, Chicago, Ill.

[*] Notice: The term of this patent shall not extend beyond the expiration date of Pat. No. 5,223,207.

[21] Appl. No.: 631,745

[22] Filed: Apr. 8, 1996

Related U.S. Application Data

[63] Continuation of Ser. No. 472,749, Jun. 7, 1995, abandoned, which is a continuation of Ser. No. 68,713, May 27, 1993, Pat. No. 5,459,675, which is a continuation-in-part of Ser. No. 827,776, Jan. 29, 1992, Pat. No. 5,223,207.

[51] Int. Cl.$^6$ .................................................. G21C 7/36
[52] U.S. Cl. .................................... 364/554; 364/576
[58] Field of Search ........................ 364/492, 554–576; 376/215–217; 395/914, 915

[56] References Cited

U.S. PATENT DOCUMENTS

| | | |
|---|---|---|
| 3,710,082 | 1/1973 | Sloane et al. . |
| 3,848,115 | 11/1974 | Sloane et al. . |
| 4,133,039 | 1/1979 | Eichenlaub . |
| 4,215,340 | 7/1980 | Lejon . |
| 4,292,129 | 9/1981 | Barry . |
| 4,399,095 | 8/1983 | Morris . |
| 4,435,751 | 3/1984 | Hori et al. . |
| 4,598,271 | 7/1986 | Wägli et al. . |
| 4,611,197 | 9/1986 | Sansky . |
| 4,627,954 | 12/1986 | Leroy et al. . |
| 4,658,245 | 4/1987 | Dye et al. . |
| 4,697,170 | 9/1987 | Hoekman . |
| 4,707,687 | 11/1987 | Thomas et al. . |
| 4,707,688 | 11/1987 | Thomas . |
| 4,744,242 | 5/1988 | Anderson et al. . |
| 4,758,964 | 7/1988 | Bittner et al. . |
| 4,772,445 | 9/1988 | Nasrallah et al. . |
| 4,783,307 | 11/1988 | Galligan et al. . |
| 4,816,208 | 3/1989 | Woods et al. . |

(List continued on next page.)

OTHER PUBLICATIONS

"Spectrum–Transformed Sequential Testing Method for Signal Validation Applications," Gross, et al., *8th Power Plant Dynamics, Control & Testing Symp.*, Knoxville, TN, May 1992.

"Sensor failure detection in dynamical systems by Kalman filtering methodology," Turkcan, Netherlands Energy Research Foundation, The Netherlands & O. Ciftcioglu, Istanbul Technical University, Turkey, Dynamics and Control in Nuclear Power Stations, BNES, London, 1991.

"Plant Monitoring and Signal Validation at HFIR," Mullens, Oak Ridge National Laboratory, Instrumentation & Controls Div., Oak Ridge, TN.

(List continued on next page.)

*Primary Examiner*—Emanuel T. Voeltz
*Assistant Examiner*—Craig Steven Miller
*Attorney, Agent, or Firm*—Reinhart, Boerner, Van Dueren, Norris & Rieselbach, s.c.

[57] ABSTRACT

A method and system for monitoring an industrial process and a sensor. The method and system include generating a first and second signal characteristic of an industrial process variable. One of the signals can be an artificial signal generated by an auto regressive moving average technique. After obtaining two signals associated with one physical variable, a difference function is obtained by determining the arithmetic difference between the two pairs of signals over time. A frequency domain transformation is made of the difference function to obtain Fourier modes describing a composite function. A residual function is obtained by subtracting the composite function from the difference function and the residual function (free of nonwhite noise) is analyzed by a statistical probability ratio test.

22 Claims, 7 Drawing Sheets

U.S. PATENT DOCUMENTS

| | | |
|---|---|---|
| 4,849,741 | 7/1989 | Thomas . |
| 4,923,117 | 5/1990 | Adams et al. . |
| 4,977,390 | 12/1990 | Saylor et al. . |
| 5,023,045 | 6/1991 | Watanabe et al. . |
| 5,103,402 | 4/1992 | Morton et al. . |
| 5,140,858 | 8/1992 | Nishimoto et al. . |
| 5,319,572 | 6/1994 | Wilhelm et al. ............... 364/510 |
| 5,392,320 | 2/1995 | Chao ............................. 376/215 |
| 5,459,675 | 10/1995 | Gross et al. .................. 364/492 |

OTHER PUBLICATIONS

"An Expert System for Sensor Data Validation & Malfunction Detection,"Hashami, et al., presented at American Nuclear Society Topical Meeting, Aug. 31–Sep. 2,1987, Snowbird, Utah.

"On–Line Test of Signal Validation Software on the Lobi–MOD2 Facility in Ispra, Italy,"Prock et al., Nuclear Technology, vol. 97, Jan. 1992.

"Spike Energy in Fault Analysis/Machine Condition Monitoring," Shea et al.

"Loose Part Monitor Sensor Validation, Impact Detection, and Characterization," Allen, Nuclear Power Journal, May–Jun. 1989.

"Reactor Operations" Artificial Intelligence Applications to Improve Nuclear Plant Operations, Quallis, et al, 1988 Winter Meeting, Washington D.C., International Conference on Nuclear Fission Fifty Years of Process in Energy Security.

"Control and Instrumentation," Upadhyaya, Nuclear Safety, vol. 26, No. 1, Jan.–Feb. 1985.

"A Methodology for the Design and Analysis of a Sensor Failure Detection Network," Chou, et al, Nuclear Technology, vol. 101, Jan. 1993.

"Validation of Smart Sensor Technologies for Instrument Calibration Reduction in Nuclear Power Plants," Hashemain, et al, NUREG/CR–5903.

"Intelligent Interfaces to Expert Systems Illustrated by a Programmable Signal Validation System," Frogner, Expert Systems Applications for the Electric Power Industry, vol. 1, 1991.

"Validation of Critical Signals for the Safty Parameter Display System," NP–5066M, Research Project 2292–1, Final Report Apr. 1987.

"Fault–Tolerant Plant Operations Systems I: A Tutorial on Concepts," Dove (NASA), p. 370–374.

"Fault–Tolerant Plant Operations Systems II: Reports on Experience in Implementation," Blancaflor, et al, pp. 375–379.

"Microcomputer–Based Fault Detection Using Redundant Sensors," Polenta, et al, IEEE Transactions on Nuclear Science, vol. 24, No. 5, Sep.–Oct. 1988.

"Construction and Evaluation of Fault Detection Network for Signal Validation," Ning et al, IEEE Transactions on Nuclear Science, vol. 39, No. 4, 1992.

"Early Fault Detection and Diagnosis in Finnish Nuclear Power Plants," Eklund, et al, Progress in Nuclear Energy, 1988, vol. 21, pp. 479–487.

"Fault Detection Method Using Power Supply Spectrum Analysis," Electronics Letters 27th Sep. 1990 vol. 26, No. 28.

"Process Hypercube Comparison for Signal Validation," Holbert, IEEE Transactions on Nuclear Science, vol. 38, No. 2, Apr. 1991.

"Algorithm–Based Fault Detection for Signal Processing Applications," Reddy et al, IEEE Transactions on Computers, vol. 39, No. 10, Oct. 1990.

"Signal Validation Techniques and Power Plant Applications," Divakaruni, et al, Progress in Nuclear Energy, vol. 22, No. 3, pp. 181–213, 1988.

"Power Signal Validation for Taiwan Research Reactor," Lee, et al, Nuclear Technology, vol. 84, Jan. 1989.

"Instrument Fault Detection in a Pressurized Water Reactor Pressurizer," Clark, et al, Nuclear Technology, vol. 56, Jan. 1982.

"An Integrated Signal Validation System for Nuclear Power Plants," Holbert, et al, Nuclear Technology, vol. 92, Dec. 1990.

"On–Line Signal Validation and Feedback Control in a Nuclear Reactor," Ray et al.

"Signal Validation with Control Room Information–Processing Computers," Belblidia, et al, Progress in Nuclear Energy, vol. 12, No. 10, pp. 551–558, 1995.

"Expert Systems application to Plant Diagnosis and Sensor Data Validation," Hashemi, et al, Power Plant Dynamics, Control & Testing Symposium, 6th Proceedings, Apr. 14–16, 1986, Knoxville, TN.

"An Expert System for Real–Tim Diagnostics and Control," Christie, et al, ANS Topical Meeting on Computer Applications for Nuclear Power Plan Operation and Control, Sep. 1985.

"Knowledge–Based Systems in Process Fault Diagnosis," Sudduth, Nuclear Engineering and Design, vol. 112, 1989.

"Sensor Fault Monitoring and Process Diagnostics," Upadhyaya, et al, Tennessee Industries Week, vol 1, Aug. 16–18, 1989.

SYSTEM FOR MONITORING AN INDUSTRIAL PROCESS AND DETERMINING SENSOR STATUS

The United States Government has rights in this invention pursuant to Contract W-31-109-ENG-38 between the U.S. Department of Energy and the University of Chicago.

This is a continuation of applications Ser. No. 08/472,749 filed on Jun. 07, 1995 now abandoned which is a continuation of application Ser. No. 08/068,713 filed on May 27, 1993 which issued as U.S. Pat. No. 5,459,675 which was a CIP of application Ser. No. 07/827,776 filed Jan. 29, 1992, now U.S. Pat. No. 5,223,207

The present invention is concerned generally with a system and method for reliably monitoring industrial processes having nonwhite noise characteristics. More particularly, the invention is concerned with a system and method for removal of nonwhite noise elements or serially correlated noise, allowing reliable supervision of an industrial process and/or operability of sensors monitoring the process.

Conventional parameter-surveillance schemes are sensitive only to gross changes in the mean value of a process, or to large steps or spikes that exceed some threshold limit check. These conventional methods suffer from either large numbers of false alarms (if thresholds are set too close to normal operating levels) or a large number of missed (or delayed) alarms (if the thresholds are set too expansively). Moreover, most conventional methods cannot perceive the onset of a process disturbance or sensor deviation which gives rise to a signal below the threshold level for an alarm condition.

In another conventional monitoring method, the Sequential Probability Ratio Test ("SPRT") has found wide application as a signal validation tool in the nuclear reactor industry. Two features of the SPRT technique make it attractive for parameter surveillance and fault detection: (1) early annunciation of the onset of a disturbance in noisy process variables, and (2) the SPRT technique has user-specifiable false-alarm and missed-alarm probabilities. One important drawback of the SPRT technique that has limited its adaptation to a broader range of nuclear applications is the fact that its mathematical formalism is founded upon an assumption that the signals it is monitoring are purely Gaussian, independent (white noise) random variables.

It is therefore an object of the invention to provide an improved method and system for continuous evaluation and/or modification of industrial processes and/or sensors monitoring the processes.

It is another object of the invention to provide a novel method and system for statistically processing industrial process signals having virtually any form of noise signal.

It is a further object of the invention to provide an improved method and system for operating on an industrial process signal to remove unwanted serially correlated noise signals.

It is still an additional object of the invention to provide a novel method and system utilizing a pair of signals to generate a difference function to be analyzed for alarm information.

It is still a further object of the invention to provide an improved method and system including at least one sensor for providing a real signal characteristic of a process and a predicted sensor signal allowing formation of a difference signal between the predicted and real sisal for subsequent analysis free from nonwhite noise contamination.

It is also an object of the invention to provide a novel method and system wherein a difference function is formed from two sensor signals, and/or pairs of signals and non-white noise is removed enabling reliable alarm analysis of the sensor signals.

It is yet an additional object of the invention to provide an improved method and system utilizing variable pairs of sensors for determining both sensor degradation and industrial process status.

Other objects, features and advantages of the present invention will be readily apparent from the following description of the preferred embodiments thereof, taken in conjunction with the accompanying drawings described below.

DETAILED DESCRIPTION OF PREFERRED EMBODIMENTS

In a method of the invention signals from industrial process sensors can be used to modify or terminate degrading or anomalous processes. The sensor signals are manipulated to provide input data to a statistical analysis technique, such as a process entitled Spectrum Transformed Sequential Testing ("SPRT"). Details of this process and the invention therein are disclosed in U.S. patent application Ser. No. 07/827,776 filed Jan. 29, 1992 now U.S. Pat. No. 5,223,207 which is incorporated by reference herein in its entirety. A further illustration of the use of SPRT for analysis of data bases is set forth in the copending application filed contemporaneously, entitled "Processing Data Base Information Having Nonwhite Noise," also incorporated by reference herein in its entirety. The procedures followed in a preferred method are shown generally in FIG. 8. In performing such a preferred analysis of the sensor signals, a dual transformation method is performed, insofar as it entails both a frequency-domain transformation of the original time-series data and a subsequent time-domain transformation of the resultant data. The data stream that passes through the dual frequency-domain, time-domain transformation is then processed with the SPRT procedure, which uses a log-likelihood ratio test. A computer software appendix is also attached hereto covering the SPRT procedure and its implementation in the context of, and modified by, the instant invention.

In the preferred embodiment, successive data observations are performed on a discrete process Y, which represents a comparison of the stochastic components of physical processes monitored by a sensor, and most preferably pairs of sensors. In practice, the Y function is obtained by simply differencing the digitized signals from two respective sensors. Let $Y_k$ represent a sample from the process Y at time $t_k$. During normal operation with an undegraded physical system and with sensors that are functioning within specifications the $Y_k$ should be normally distributed with mean of zero. Note that if the two signals being compared do not have the same nominal mean values (due, for example, to differences in calibration), then the input signals will be pre-normalized to the same nominal mean values during initial operation.

In performing the monitoring of industrial processes, the system's purpose is to declare a first system or a second system degraded if the drift in Y is sufficiently large that the sequence of observations appears to be distributed about a mean $+M$ or $-M$, where M is our pre-assigned system-disturbance magnitude. We would like to devise a quantitative framework that enables us to decide between two hypotheses, namely:

$H_1$: Y is drawn from a Gaussian probability distribution function ("PDF") with mean M and variance $\sigma^2$.

$H_2$: Y is drawn from a Gaussian PDF with mean 0 and variance $\sigma^2$.

We will suppose that if $H_1$ or $H_2$ is true, we wish to decide for $H_1$ or $H_2$ with probability $(1-\beta)$ or $(1-\alpha)$, respectively, where $\alpha$ and $\beta$ represent the error (misidentification) probabilities.

From the conventional, well known theory of Wald, the test depends on the likelihood ratio $l_n$, where $$l_n = \frac{\text{The probability of observed sequence } y_1, y_2 \ldots, y_n \text{ given } H_1 \text{ true}}{\text{The probability of observed sequence } y_1, y_2 \ldots, y_n \text{ given } H_2 \text{ true}} \quad (1)$$

After "n" observations have been made, the sequential probability ratio is just the product of the probability ratios for each step:

$$l_n = (PR_1) \cdot (PR_2) \cdot \ldots \cdot (PR_n) \quad (2)$$

or $$l_n = \prod_{i=1}^{i=n} \frac{f(y_i|H_1)}{f(y_i|H_2)} \quad (3)$$

where f(y|H) is the distribution of the random variable y.

Wald's theory operates as follows: Continue sampling as long as $A < l_n < B$. Stop sampling and decide $H_1$ as soon as $l_n \geq B$, and stop sampling and decide $H_2$ as soon as $l_n \leq A$. The acceptance thresholds are related to the error (misidentification) probabilities by the following expressions:

$$A = \frac{\beta}{1-\alpha}, \text{ and } B = \frac{1-\beta}{\alpha} \quad (4)$$

The (user specified) value of $\alpha$ is the probability of accepting $H_1$ when $H_2$ is true (false alarm probability). $\beta$ is the probability of accepting $H_2$ when $H_1$ is true (missed alarm probability).

If we can assume that the random variable $Y_k$ is normally distributed, then the likelihood that $H_1$ is true (i.e., mean M, variance $\sigma^2$) is given by:

$$L(y_1, y_2 \ldots, y_n|H_1) = \frac{1}{(2\pi)^{n/2} \sigma^n} \exp\left[-\frac{1}{2\sigma^2} \left(\sum_{k=1}^{n} y_k^2 - 2\sum_{k=1}^{n} y_k M + \sum_{k=1}^{n} M^2\right)\right] \quad (5)$$

Similarly for $H_2$ (mean 0, variance $\sigma^2$):

$$L(y_1, y_2 \ldots, y_n|H_2) = \frac{1}{(2\pi)^{n/2} \sigma^n} \exp\left(-\frac{1}{2\sigma^2} \sum_{k=1}^{n} y_k^2\right) \quad (6)$$

The ratio of (5) and (6) gives the likelihood ratio $l_n$ $$l_n = \exp\left[-\frac{1}{2\sigma^2} \sum_{k=1}^{n} M(M - 2y_k)\right] \quad (7)$$

Combining (4) and (7), and taking natural logs gives $$\ln \frac{\beta}{1-\alpha} < \frac{-1}{2\sigma^2} \sum_{k=1}^{n} M(M - 2y_k) < \ln \frac{(1-\beta)}{\alpha} \quad (8)$$

Our sequential sampling and decision strategy can be concisely represented as:

$$\text{If } l_n \leq \ln \frac{\beta}{1-\alpha}, \text{ Accept } H_2 \quad (9)$$

$$\text{If } \ln \frac{\beta}{1-\alpha} < l_n < \ln \frac{1-\beta}{\alpha}, \text{ Continue Sampling} \quad (10)$$

$$\text{And if } l_n \geq \ln \frac{1-\beta}{\alpha}, \text{ Accept } H_1 \quad (11)$$

Following Wald's sequential analysis, it is conventional that a decision test based on the log likelihood ratio has an optimal property; that is, for given probabilities $\alpha$ and $\beta$ there is no other procedure with at least as low error probabilities or expected risk and with shorter length average sampling time.

A primary limitation that has heretofore precluded the applicability of Wald-type binary hypothesis tests for sensor and equipment surveillance strategies lies in the primary assumption upon which Wald's theory is predicated; i.e, that the original process Y is strictly "white" noise, independently-distributed random data. Such white noise can, for example, include Gaussian noise. It is, however, very rare to find physical process variables associated with operating machinery that are not contaminated with serially-correlated, deterministic noise components. Such serially correlated noise components includes, for example, auto-correlated and Markov dependent noise. This invention can overcome this limitation to conventional surveillance strategies by integrating the Wald sequential-test approach with a new dual transformation technique. This symbiotic combination of frequency-domain transformations and time-domain transformations produces a tractable solution to a particularly difficult problem that has plagued signal-processing specialists for many years.

Figure 8A:
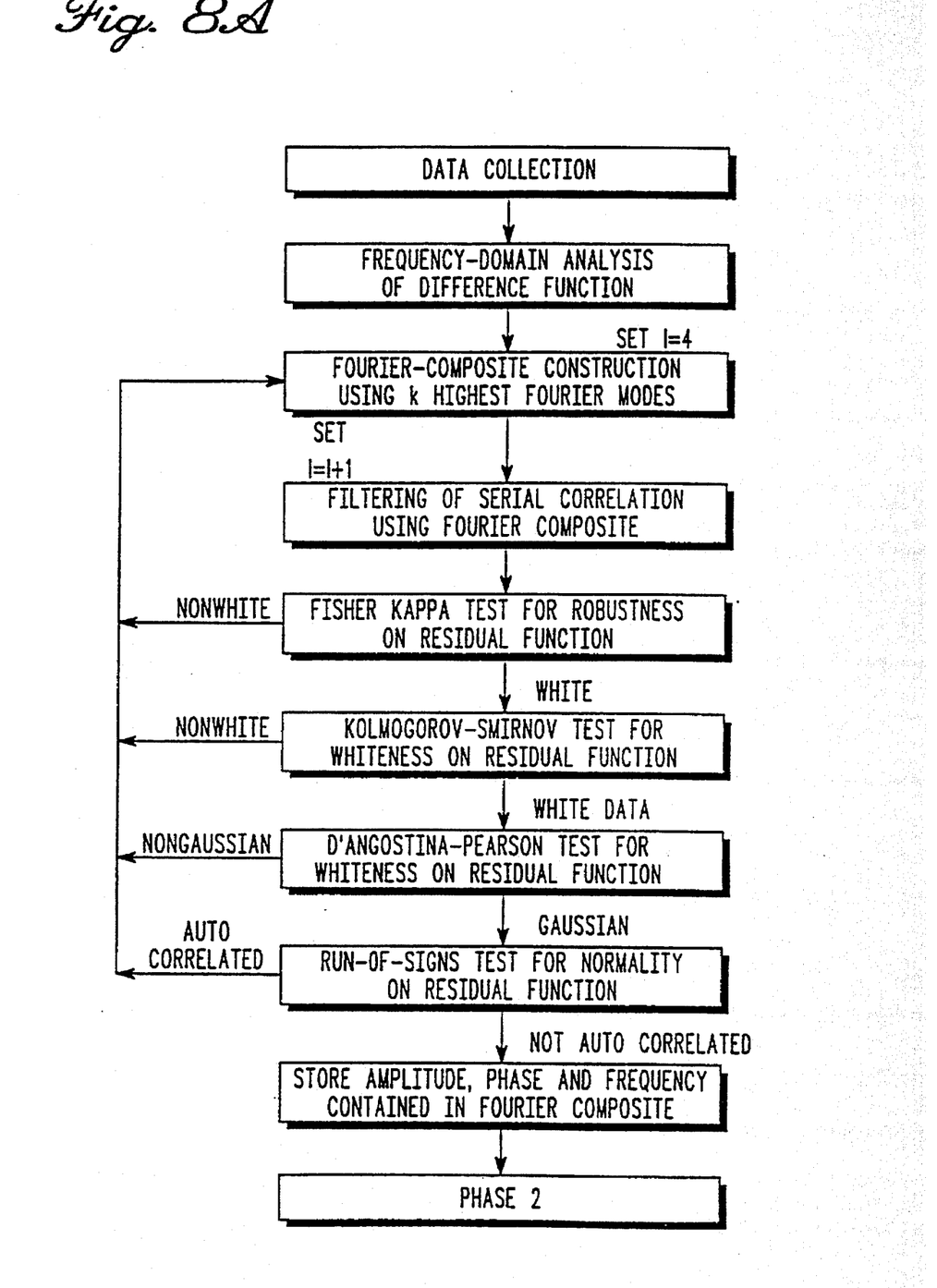
FIGS. 8a and 8b illustrate schematic functional flow diagrams of the invention with FIG. 8A showing a first phase of the method of the invention and FIG. 8B shows the application of the method of the invention.
Figure 8B:
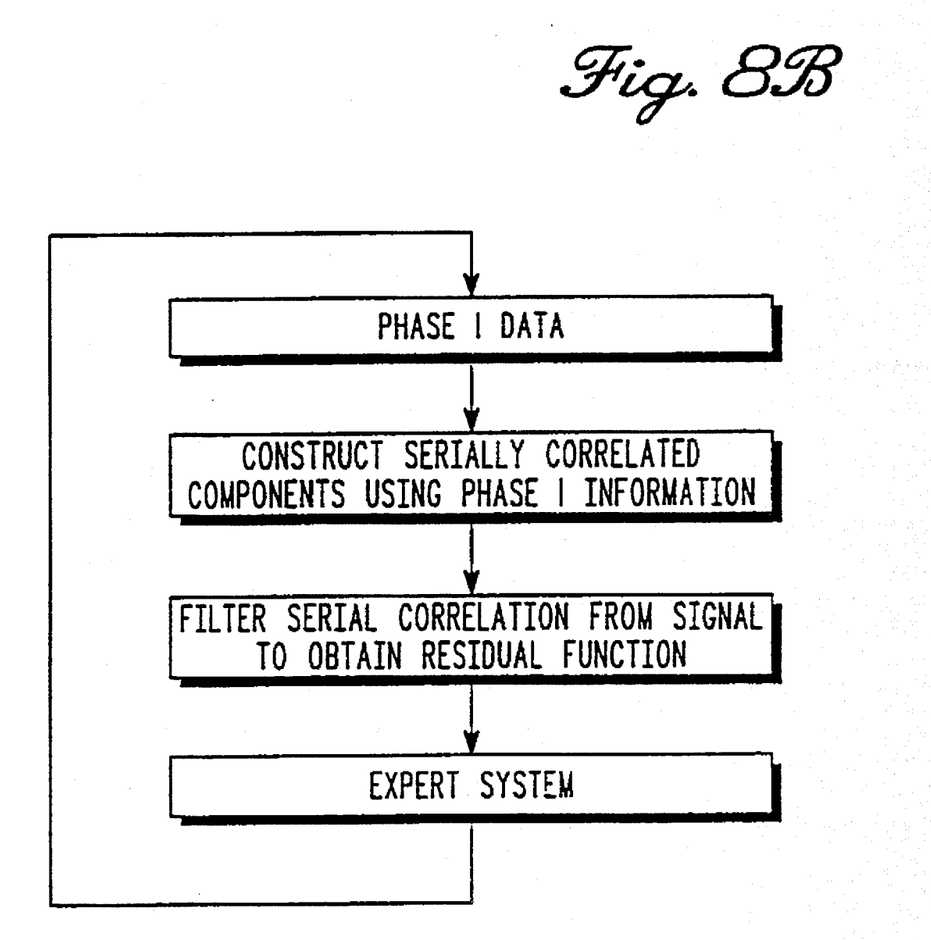

In the preferred embodiment of the method shown in detail in FIG. 8, serially-correlated data signals from an industrial process can be rendered amenable to the SPRT testing methodology described hereinbefore. This is preferably done by performing a frequency-domain transformation of the original difference function Y. A particularly preferred method of such a frequency transformation is accomplished by generating a Fourier series using a set of highest "1" number of modes. Other procedures for rendering the data amenable to SPRT methods includes, for example, auto regressive techniques, which can accomplish substantially similar results described herein for Fourier analysis. In the preferred approach of Fourier analysis to determine the "1" highest modes (see FIG. 8A):

$$Y_t = \frac{\alpha_0}{2} + \sum_{m=1}^{\frac{N}{2}} (a_m \cos \omega_m t + b_m \sin \omega_m t) \quad (12)$$

where $a_0/2$ is the mean value of the series, $a_m$ and $b_m$ are the Fourier coefficients corresponding to the Fourier frequency $\omega_m$, and N is the total number of observations. Using the Fourier coefficients, we next generate a composite function, $X_t$, using the values of the largest harmonics identified in the Fourier transformation of $Y_t$. The following numerical approximation to the Fourier transform is useful in determining the Fourier coefficients $a_m$ and $b_m$. Let $x_j$ be the value of $X_t$ at the jth time increment. Then assuming $2\pi$ periodicity and letting $\omega_m = 2\pi m/N$, the approximation to the Fourier transform yields:

$$a_m = \frac{2}{N} \sum_{j=0}^{N-1} X_j \cos \omega_m j \quad (13)$$

$$b_m = \frac{2}{N} \sum_{j=0}^{N-1} X_j \sin \omega_m j$$

for $0 < m < N/2$. Furthermore, the power spectral density ("PSD") function for the signal is given by $1_m$ where $$l_m = N \frac{a_m^2 + b_m^2}{2} \quad (14)$$

To keep the signal bandwidth as narrow as possible without distorting the PSD, no spectral windows or smoothing are used in our implementation of the frequency-domain transformation. In analysis of a pumping system of the EBR-II reactor of Argonne National Laboratory, the Fourier modes corresponding to the eight highest $1_m$, provide the amplitudes and frequencies contained in $X_t$. In our investigations for the particular pumping system data taken, the highest eight $1_m$ modes were found to give an accurate reconstruction of $X_t$ while reducing most of the serial correlation for the physical variables we have studied. In other industrial processes, the analysis could result in more or fewer modes being needed to accurately construct the functional behavior of a composite curve. Therefore, the number of modes used is a variable which is iterated to minimize the degree of nonwhite noise for any given application. As noted in FIG. 8A a variety of noise tests are applied in order to remove serially correlated noise.

The reconstruction of $X_t$ uses the general form of Eqn. (12), where the coefficients and frequencies employed are those associated with the eight highest PSD values. This yields a Fourier composite curve (see end of flowchart in FIG. A) with essentially the same correlation structure and the same mean as $Y_t$. Finally, we generate a discrete residual function $R_t$ by differencing corresponding values of $Y_t$ and $X_t$. This residual function, which is substantially devoid of serially correlated contamination, is then processed with the SPRT technique described hereinbefore.

In a specific example application of the above referenced methodology, certain variables were monitored from the Argonne National Laboratory reactor EBR-II. In particular, EBR-II reactor coolant pumps (RCPs) and delayed neutron (DN) monitoring systems were tested continuously to demonstrate the power and utility of the invention. The RCP and DN systems were chosen for initial application of the approach because SPRT-based techniques have already been under development for both the systems. All data used in this investigation were recorded during full-power, steady state operation at EBR-II. The data have been digitized at a 2-per-second sampling rate using $2^{14}$ (16,384) observations for each signal of interest.

Figure 1:
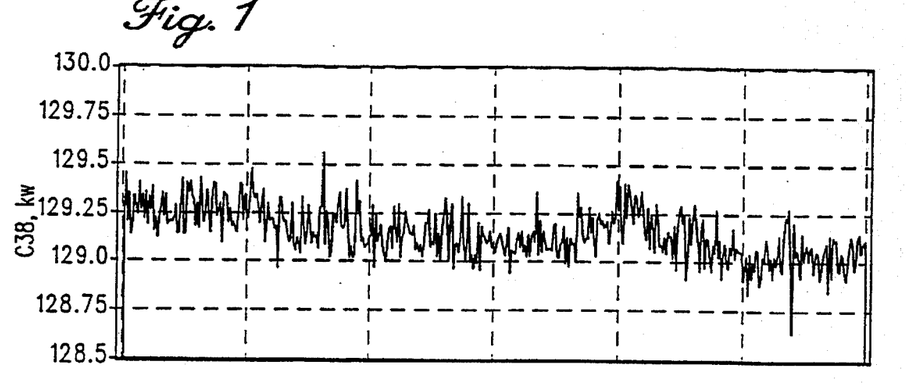
FIG. 1 illustrates the specified output of a pump's power output over time.
Figure 2:
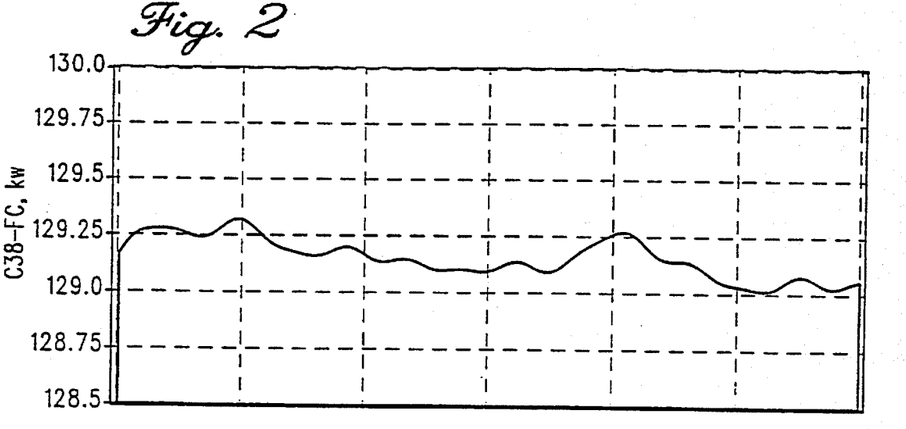
FIG. 2 shows a Fourier composite curve fit to the pump spectral output of FIG. 1.
Figure 3:
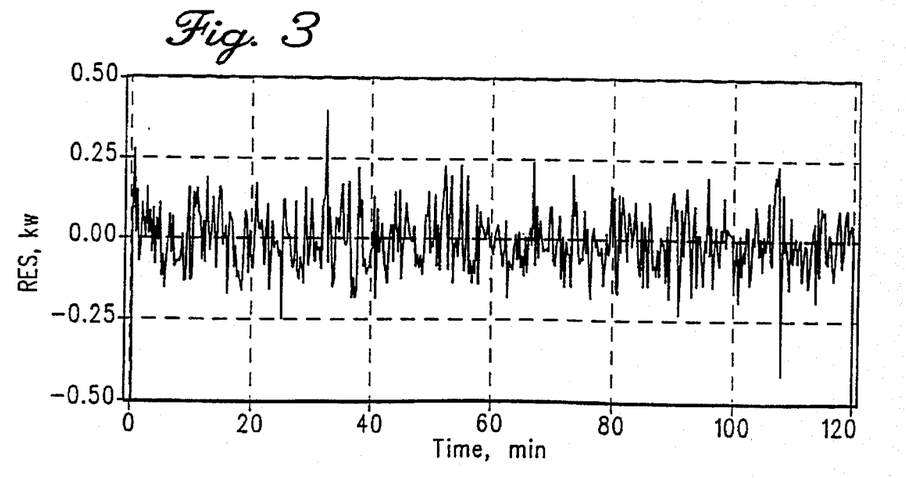
FIG. 3 illustrates a residual function characteristic of the difference between FIGS. 1 and 2.
Figure 4A:
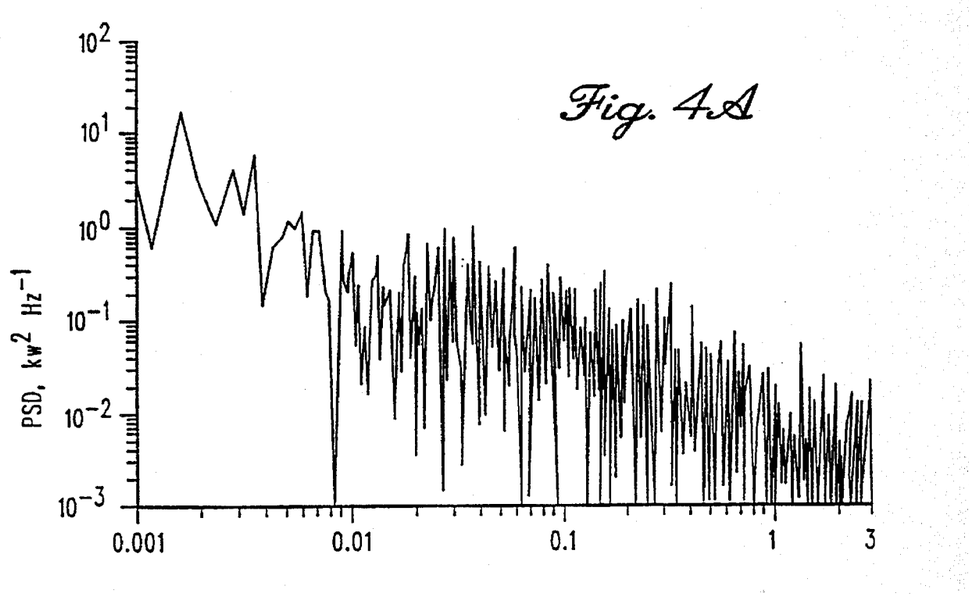
FIG. 4A shows a periodogram of the spectral data of FIG. 1
Figure 4B:
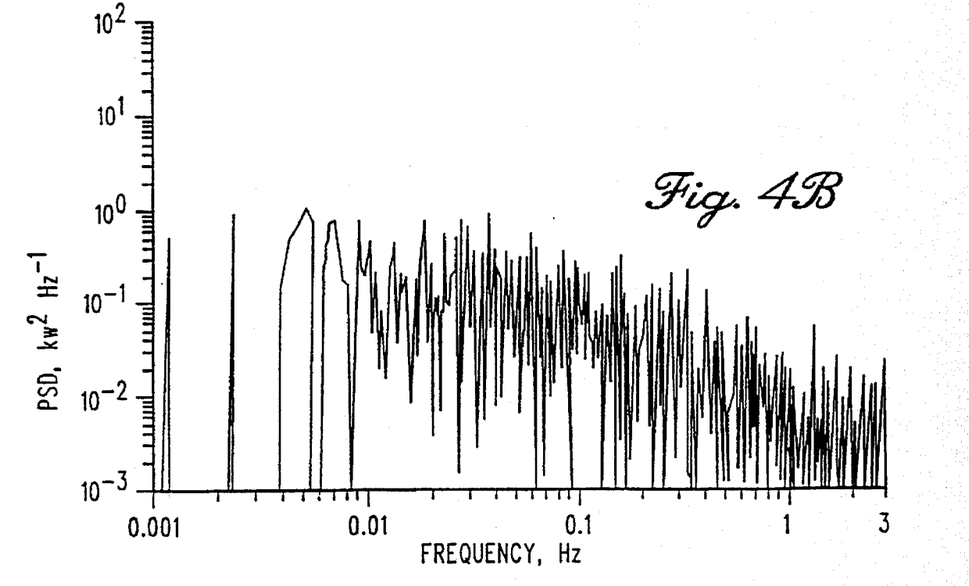
FIG. 4B shows a periodogram of the residual function of FIG. 3.
Figure 5A:
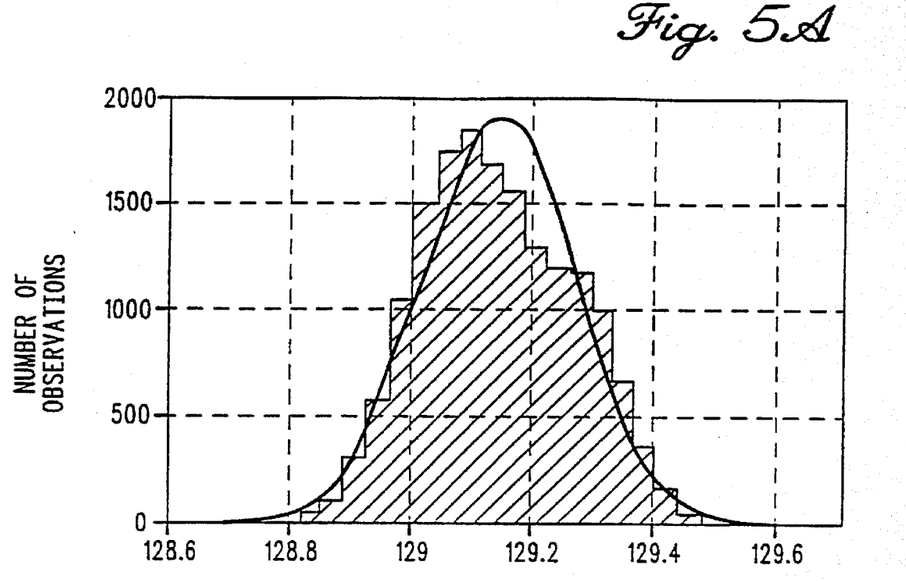
FIG. 5A illustrates a noise histogram for the pump power output of FIG. 1
Figure 5B:
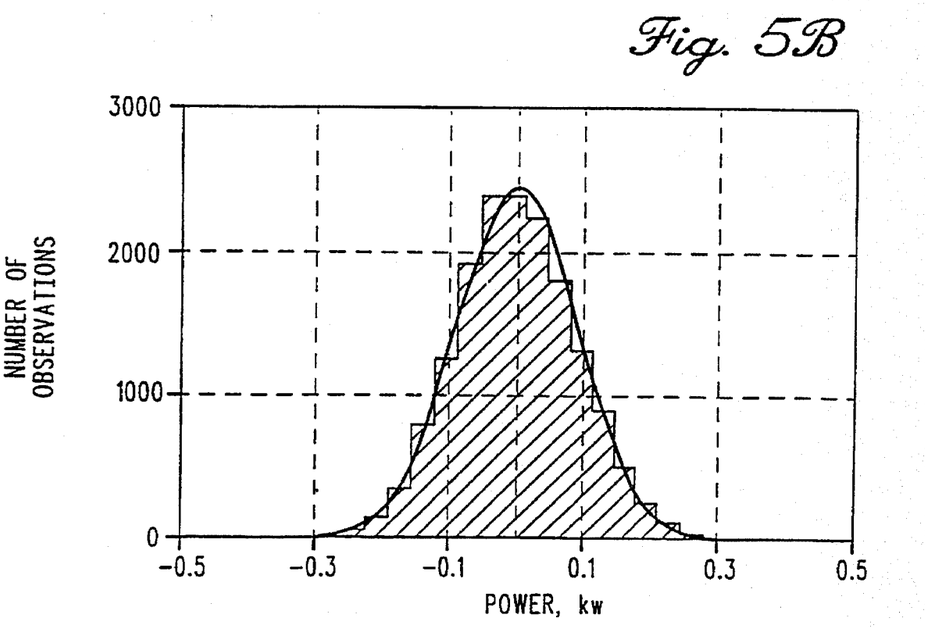
FIG. 5B illustrates a noise histogram for the residual function of FIG. 3.

FIGS. 1-3 illustrate data associated with the preferred spectral filtering approach as applied to the EBR-II primary pump power signal, which measures the power (in kW) needed to operate the pump. The basic procedure of FIG. 8 was then followed in the analysis. FIG. 1 shows 136 minutes of the original signal as it was digitized at the 2-Hz sampling rate. FIG. 2 shows a Fourier composite constructed from the eight most prominent harmonics identified in the original signal. The residual function, obtained by subtracting the Fourier composite curve from the raw data, is shown in FIG. 3. Periodograms of the raw signal and the residual function have been computed and are plotted in FIG. 4. Note the presence of eight depressions in the periodogram of the residual function in FIG. 4B, corresponding to the most prominent periodicities in the original, unfiltered data. Histograms computed from the raw signal and the residual function are plotted in FIG. 5. For each histogram shown we have superimposed a Gaussian curve (solid line) computed from a purely Gaussian distribution having the same mean and variance. Comparison of FIG. 5A and 5B provide a clear demonstration of the effectiveness of the spectral filtering in reducing asymmetry in the histogram. Quantitatively, this decreased asymmetry is reflected in a decrease in the skewness (or third moment of the noise) from 0.15 (raw signal) to 0.10 (residual function).

It should be noted here that selective spectral filtering, which we have designed to reduce the consequences of serial correlation in our sequential testing scheme, does not require that the degree of nonnormality in the data will also be reduced. For many of the signals we have investigated at EBR-II, the reduction in serial correlation is, however, accompanied by a reduction in the absolute value of the skewness for the residual function.

To quantitatively evaluate the improvement in whiteness effected by the spectral filtering method, we employ the conventional Fisher Kappa white noise test. For each time series we compute the Fisher Kappa statistic from the defining equation $$\kappa = \left[ \frac{1}{N} \sum_{k=1}^{N} l(\omega_k) \right]^{-1} l(L) \quad (15)$$

where $1(\omega_k)$ is the PSD function (see Eq. 14) at discrete frequencies $\omega_k$, and 1(L) signifies the largest PSD ordinate identified in the stationary time series.

The Kappa statistic is the ratio of the largest PSD ordinate for the signal to the average ordinate for a PSD computed from a signal contaminated with pure white noise. For EBR-II the power signal for the pump used in the present example has a $\kappa$ of 1940 and 68.7 for the raw signal and the residual function, respectively. Thus, we can say that the spectral filtering procedure has reduced the degree of nonwhiteness in the signal by a factor of 28. Strictly speaking, the residual function is still not a pure white noise process. The 95% critical value for Kappa for a time series with $2^{14}$ observations is 12.6. This means that only for computed Kappa statistics lower than 12.6 could we accept the null hypothesis that the signal is contaminated by pure white noise. The fact that our residual function is not purely white is reasonable on a physical basis because the complex interplay of mechanisms that influence the stochastic components of a physical process would not be expected to have a purely white correlation structure. The important point, however, is that the reduction in nonwhiteness effected by the spectral filtering procedure using only the highest eight harmonics in the raw signal has been found to preserve the pre-specified false alarm and missed alarm probabilities in the SPRT sequential testing procedure (see below). Table I summarizes the computed Fisher Kappa statistics for thirteen EBR-II plant signals that are used in the subject surveillance systems. In every case the table shows a substantial improvement in signal whiteness.

The complete SPRT technique integrates the spectral decomposition and filtering process steps described hereinbefore with the known SPRT binary hypothesis procedure. The process can be illustratively demonstrated by application of the SPRT technique to two redundant delayed neutron detectors (designated DND A and DND B) whose signals were archived during long-term normal (i.,e., undegraded) operation with a steady DN source in EBR-II. For demonstration purposes a SPRT was designed with a false alarm rate, $\alpha$, of 0.01. Although this value is higher than we would designate for a production surveillance system, it gives a reasonable frequency of false alarms so that asymptotic values of $\alpha$ can be obtained with only tens of thousands of discrete observations. According to the theory of the SPRT technique, it can be easily proved that for pure white noise (such as Gaussian), independently distributed processes, $\alpha$ ct provides an upper bound to the probability (per observation interval) of obtaining a false alarm—i.e., obtaining a "data disturbance" annunciation when, in fact, the signals under surveillance are undegraded.

FIGS. 6 and 7 illustrate sequences of SPRT results for raw DND signals and for spectrally-whitened DND signals, respectively. In FIGS. 6A and 6B, and 7A and 7B, respectively, are shown the DN signals from detectors DND-A and DND-B. The steady-state values of the signals have been normalized to zero.

TABLE I

Effectiveness of Spectral Filtering for Measured Plant Signals

| Plant Variable I.D. | Fisher Kappa Test Statistic (N = 16,384) | |
| --- | --- | --- |
| | Raw Signal | Residual Function |
| Pump 1 Power | 1940 | 68.7 |
| Pump 2 Power | 366 | 52.2 |
| Pump 1 Speed | 181 | 25.6 |
| Pump 2 Speed | 299 | 30.9 |
| Pump 1 Radial Vibr (top) | 123 | 67.7 |
| Pump 2 Radial Vibr (top) | 155 | 65.4 |
| Pump 1 Radial Vibr (bottom) | 1520 | 290.0 |
| Pump 2 Radial Vibr (bottom) | 1694 | 80.1 |
| DN Monitor A | 96 | 39.4 |
| DN Monitor B | 81 | 44.9 |
| DN Detector 1 | 86 | 36.0 |
| DN Detector 2 | 149 | 44.1 |
| DN Detector 3 | 13 | 8.2 |

Figure 6A:
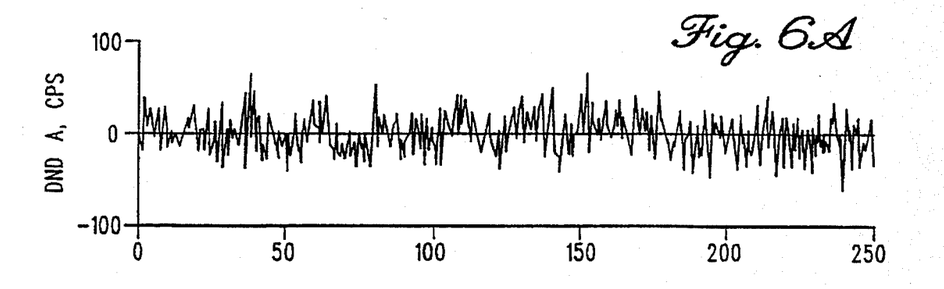
FIG. 6A shows an unmodified delayed neutron detector signal from a first sensor and FIG. 6B is for a second neutron sensor.
Figure 6B:
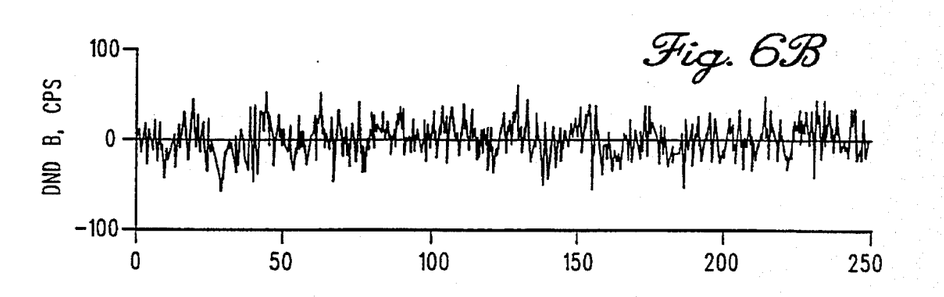
Figure 6C:
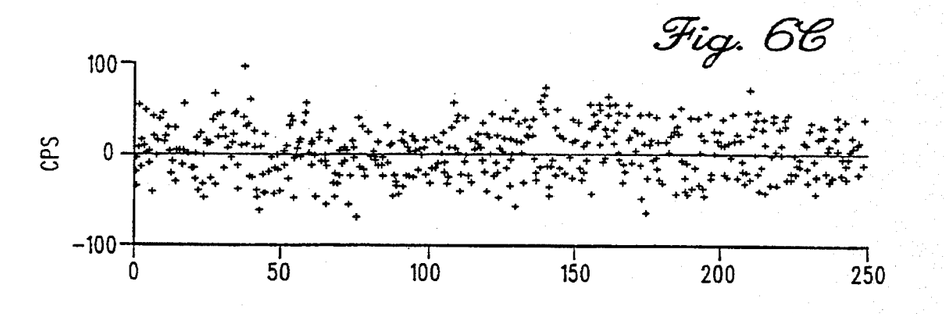
FIG. 6C shows a difference function characteristic of the difference between data in FIG. 6A and 6B and FIG. 6D shows the data output from a SPRT analysis with alarm conditions indicated by the diamond symbols.

Normalization to adjust for differences in calibration factor or viewing geometry for redundant sensors does not affect the operability of the SPRT. FIGS. 6C and 7C in each figure show pointwise differences of signals DND-A and DND-B. It is this difference function that is input to the SPRT technique. Output from the SPRT method is shown for a 250-second segment in FIGS. 6D and 7D.

Figure 6D:
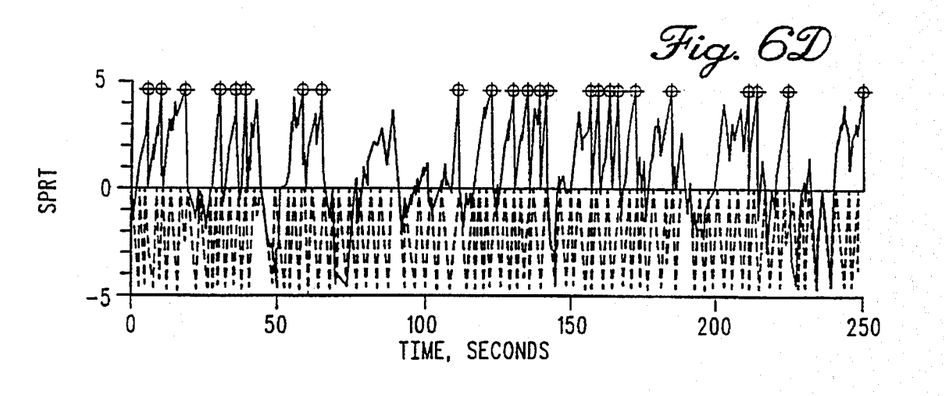
Figure 7A:
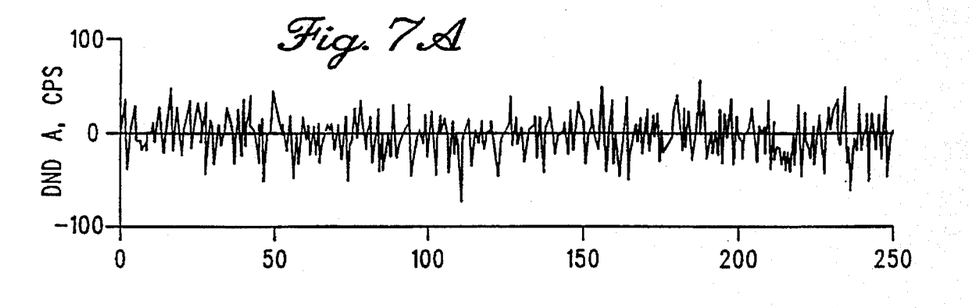
FIG. 7A illustrates an unmodified delayed neutron detector signal from a first sensor and FIG. 7B is for a second neutron sensor.
Figure 7B:
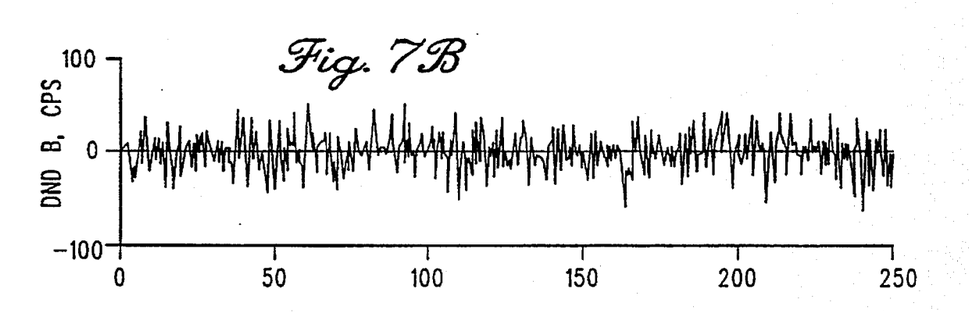
Figure 7C:
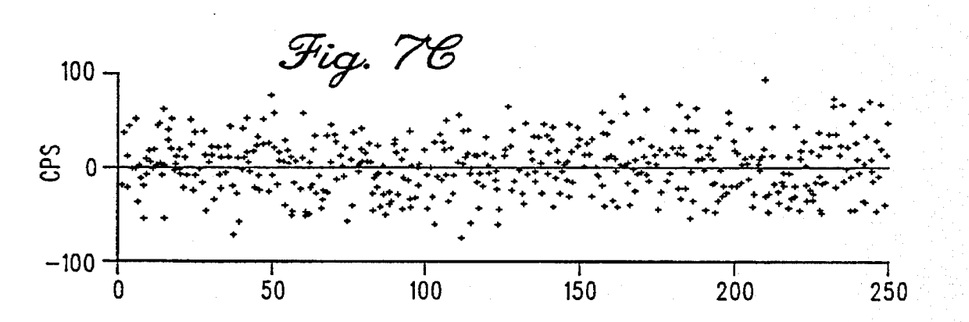
FIG. 7C shows a difference function for the difference between the data of FIG. 7A and 7B and FIG. 7D shows the result of using the instant invention to modify the difference function to provide data free of serially correlated noise to the SPRT analysis to generate alarm information and with alarm conditions indicated by the diamond signals.
Figure 7D:
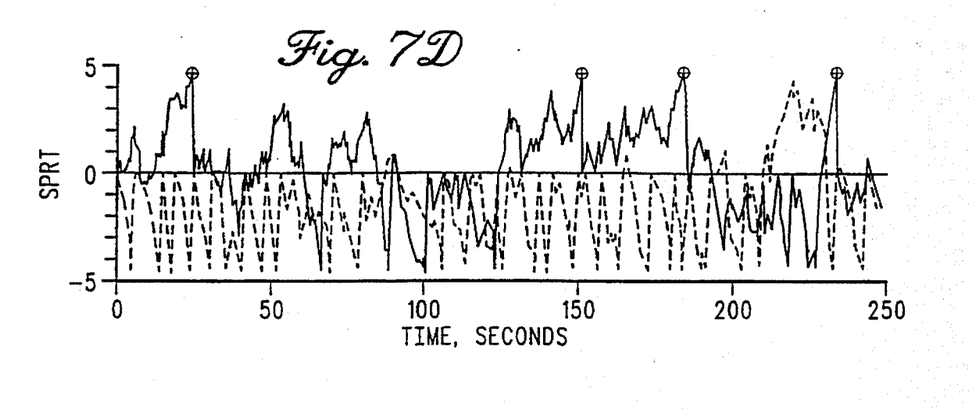

Interpretation of the SPRT output in FIGS. 6D and 7D is as follows: When the SPRT index reaches a lower threshold, A, one can conclude with a 99% confidence factor that there is no degradation in the sensors. For this demonstration A is equal to 4.60, which corresponds to false-alarm and missed-alarm probabilities of 0.01. As FIGS. 6D and 7D illustrate, each time the SPRT output data reaches A, it is reset to zero and the surveillance continues.

If the SPRT index drifts in the positive direction and exceeds a positive threshold, B, of +4.60, then it can be concluded with a 99% confidence factor that there is degradation in at least one of the sensors. Any triggers of the positive threshold are signified with diamond symbols in FIGS. 6D and 7D. In this case, since we can certify that the detectors were functioning properly during the time period our signals were being archived, any triggers of the positive threshold are false alarms.

If we extend sufficiently the surveillance experiment illustrated in FIG. 6D, we can get an asymptotic estimate of the false alarm probability $\alpha$. We have performed this exercise using 1000-observation windows, tracking the frequency of false alarm trips in each window, then repeating the procedure for a total of sixteen independent windows to get an estimate of the variance on this procedure for evaluating $\alpha$. The resulting false-alarm frequency for the raw, unfiltered, signals is $\alpha$=0.07330 with a variance of 0.000075. The very small variance shows that there would be only a negligible improvement in our estimate by extending the experiment to longer data streams. This value of $\alpha$ is significantly higher than the design value of $\alpha$=0.01, and illustrates the danger of blindly applying a SPRT test technique to signals that may be contaminated by excessive serial correlation.

The data output shown in FIG. 7D employs the complete SPRT technique shown schematically in FIG. 8. When we repeat the foregoing exercise using 16 independent 1000-observation windows, we obtain an asymptotic cumulative false-alarm frequency of 0.009142 with a variance of 0.000036. This is less than (i.e., more conservative than) the design value of $\alpha$=0.01, as desired.

It will be recalled from the description hereinbefore regarding one preferred embodiment, we have used the eight most prominent harmonics in the spectral filtration stage of the SPRT technique. By repeating the foregoing empirical procedure for evaluating the asymptotic values of $\alpha$, we have found that eight modes are sufficient for the input variables shown in Table I. Furthermore, by simulating subtle degradation in individual signals, we have found that the presence of serial correlation in raw signals gives rise to excessive missed-alarm probabilities as well. In this case spectral whitening is equally effective in ensuring that pre-specified missed-alarm probabilities are not exceeded using the SPRT technique.

In another different form of the invention, it is not necessary to have two sensor signals to form a difference function. One sensor can provide a real signal characteristic of an ongoing process and a record artificial signal can be generated to allow formation of a difference function. Techniques such as an auto regressive moving average (ARMA) methodology can be used to provide the appropriate signal, such as a DC level signal, a cyclic signal or other predictable signal. Such an ARMA method is a well-known procedure for generating artificial signal values, and this method can even be used to learn the particular cyclic nature of a process being monitored enabling construction of the artificial signal.

The two signals, one a real sensor signal and the other an artificial signal, can thus be used in the same manner as described hereinbefore for two real sensor signals. The difference function Y is then formed, transformations performed and a residual function is determined which is free of serially correlated noise.

Fourier techniques are very effective in achieving a whitened signal for analysis, but there are other means to achieve substantially the same results using a different analytical methodology. For example, filtration of serial correlation can be accomplished by using the autoregressive moving average (ARMA) method. This ARMA technique estimates the specific correlation structure existing between sensor points of an industrial process and utilizes this correlation estimate to effectively filter the data sample being evaluated.

A technique has therefore been devised which integrates frequency-domain filtering with sequential testing methodology to provide a solution to a problem that is endemic to industrial signal surveillance. The subject invention particularly allows sensing slow degradation that evolves over a long time period (gradual decalibration bias in a sensor, appearance of a new radiation source in the presence of a noisy background signal, wear out or buildup of a radial rub in rotating machinery, etc.). The system thus can alert the operator of the incipience or onset of the disturbance long before it would be apparent to visual inspection of strip chart or CRT signal traces, and well before conventional threshold limit checks would be tripped. This permits the operator to terminate, modify or avoid events that might otherwise challenge technical specification guidelines or availability goals. Thus, in many cases the operator can schedule corrective actions (sensor replacement or recalibration; component adjustment, alignment, or rebalancing; etc.) to be performed during a scheduled system outage.

Another important feature of the technique which distinguishes it from conventional methods is the built-in quantitative false-alarm and missed-alarm probabilities. This is quite important in the context of high-risk industrial processes and applications. The invention makes it possible to apply formal reliability analysis methods to an overall system comprising a network of interacting SPRT modules that are simultaneously monitoring a variety of plan variables. This amenability to formal reliability analysis methodology will, for example, greatly enhance the process of granting approval for nuclear-plant applications of the invention, a system that can potentially save a utility millions of dollars per year per reactor.

While preferred embodiments of the invention have been shown and described, it will be clear to those skilled in the an that various changes and modifications can be made without departing from the invention in its broader aspects as set forth in the claims provided hereinafter.

What is claimed is:

1. A method of testing at least one of a process and a sensor for determining a particular condition therein, comprising the steps of:
    operating at least a first and second sensor to redundantly detect at least one variable of the process to provide a first signal from said first sensor and a second signal from said second sensor, each said signal being characteristic of the one variable;
    obtaining a difference function characteristic of the difference pairwise between said first signal and said second signal at each of a plurality of different times of sensing the one variable;
    obtaining a frequency domain transformation of said first difference function to procure Fourier coefficients corresponding to Fourier frequencies;
    generating a composite function over time domain using the Fourier coefficients;
    obtaining a residual function over time by determining the difference between the difference function and the composite function, the residual function being substantially free of serially correlated noise;
    operating on the residual function using computer means for performing a statistical analysis technique to determine whether a particular condition is present in at least one of the process and the sensor, the residual function having substantially white noise characteristics input to the statistical analysis technique; and
    said sensor system providing alarm information to a user of the process allowing changing of at least one of the process and the at least first and second sensor when the particular condition is detected.

2. The method described in claim 1 wherein said computer means comprises an artificial intelligence system.

3. The method as defined in claim 1 wherein the residual function futher comprises reduced Markov dependent noise.

4. The method as defined in claim 1, wherein the process comprises at least one of a chemical process, a mechanical process and an electrical operational process.

5. The method as defined in claim 1 wherein the step of obtaining Fourier coefficients comprises iteratively determining the minimum number of Fourier harmonics able to generate the composite function.

6. The method as defined in claim 1 further including at least one of the steps of modifying the process or changing the sensor responsive to the alarm condition.

7. The method as defined in claim 6 wherein the step of modifying the process or changing the sensor comprises ceasing its operation.

8. A method of operating a system to test at least one of a process and a sensor for determinining fault conditions therein, comprising the steps of:
    operating at least one sensor of the system to detect at least one variable of the process to provide a real signal from said one sensor;
    generating an artificial signal characteristic of the one variable;
    obtaining a difference function characteristic of the difference pairwise between said real signal and said artificial signal at each of a plurality of different times of sensing the one physical variable;
    obtaining a frequency domain transformation of said difference function;
    generating a composite function over a time domain;
    obtaining a residual function over time by determining the difference between the difference function and the composite function;
    operating on the residual function using a computer for performing a statistical analysis technique to determine whether an alarm condition is present in at least one of the process and the at least one sensor, the residual function including white noise characteristics of an uncorrelated signal of reduced skewness relative to the difference function and being input to the statistical analysis technique; and
    said at least one sensor providing a signal to said system allowing modification of at least one of the process and the at least one sensor when an alarm condition is detected.

9. The method as defined in claim 8 wherein the step of obtaining a frequency domain transformation comprises performing a Fourier transformation.

10. The method as defined in claim 8 wherein the steps of obtaining a composite function over time comprises performing an auto regressive moving average analysis.

11. The method as defined in claim 8 further including the step of determining a difference function for both the artificial signal and the real signal.

12. The method as defined in claim 8 wherein the residual function futher comprises reduced Markov dependent noise.

13. The method as defined in claim 9 wherein the step of obtaining a frequency domain transformation comprises obtaining Fourier coefficients iteratively to determine the minimum number of Fourier harmonics able to generate the composite function.

14. A system for testing at least one of a process and a data source for determining a fault condition therein, comprising:
at least a first data source to collect data of at least one variable of the process to provide a signal from said first data source;
a second data source to collect data for comparison with said real signal from said first data source;
means for determining a difference function characteristic of the arithmetic difference pairwise between said signals from said first and second data source at each of a plurality of different times of sensing the one variable;
means for generating a composite function;
means for obtaining a residual function over time by means for determining the arithmetic difference between the difference function and the composite function, the residual function including white noise characteristics of an uncorrelated signal of reduced skewness;
means for operating on the residual function including computer means for performing a statistical analysis technique and for determining whether an alarm condition is present in at least one of the process and the at least first and second data source, said means for obtaining a residual function and said means for operating on the residual function cooperatively providing a function comprised of said white noise characteristics of uncorrelated signal of reduced skewness relative to the difference function as an input to the statistical analysis technique; and
means for providing information allowing modification of at least one of the process and the at least first data source when an alarm condition is detected.

15. The system as defined in claim 14 futher including means for obtaining a frequency domain transformation of said difference function.

16. The system as defined in claim 14 wherein said computer means comprises an artificial intelligence system.

17. The system as defined in claim 14 wherein said means for generating a second data source comprises computer means for executing a computer program.

18. The system as defined in claim 17 wherein the computer program includes an autoregressive moving average procedure.

19. The system as defined in claim 14 wherein said computer means executes a computer program including a statistical probability ratio test on the residual function.

20. The system as defined in claim 14 further including means for changing at least one of the process and substituting another data source for a defective data source.

21. A method of using a system for testing at least one of a process and at least a first and second data source for determining fault conditions therein, comprising the steps of:
accumulating data from the at least first and second data source of the system to redundantly detect at least one variable of the process to provide a first signal from said first data source and a second signal from said second data source, each said signal being characteristic of the one variable;
obtaining a difference function characteristic of the arithmetic difference pairwise between said first signal and said second signal at each of a plurality of different times of sensing the one variable;
obtaining a frequency domain transformation of said first difference function to procure Fourier coefficients corresponding to Fourier frequencies;
generating a composite function over time domain using the Fourier coefficients;
obtaining a residual function over time by determining the arithmetic difference between the difference function and the composite function, the residual function including white noise characteristics of an uncorrelated function of reduced skewness relative to the difference function;
operating on the residual function using computer means for performing a statistical analysis technique to determine whether an alarm condition is present in at least one of the process and the at least first and second data source; and
said at least first and second data source providing a signal to the system which produces alarm information allowing modification of at least one of the process and the at least first and second data source when the alarm condition is detected by the system.

22. A method of operating a system for testing at least one of a process and at least one data source for determining fault conditions therein, comprising the steps of:
using the at least one data source of the system to detect at least one variable of the process to provide a real signal from said at least one data source of the system;
generating an artificial signal characteristic of the one variable using the system;
obtaining a difference function characteristic of the difference pairwise between said real signal and said artificial signal at each of a plurality of different times of sensing the one variable;
obtaining a frequency domain transformation of said difference function;
generating a composite function over a time domain;
obtaining a residual function over time by determining the difference between the difference function and the composite function, the residual function comprising white noise characteristics of an uncorrelated signal of reduced skewness relative to the difference function;
operating on the residual function using computer means for performing a statistical analysis technique to determine whether an alarm condition is present in at least one of the process and the at least one data source; and
said at least one data source providing a signal to the system for generating alarm information to a user of the process allowing modification of at least one of the process and the at least one data source when the alarm condition is detected.

* * * * *

UNITED STATES PATENT AND TRADEMARK OFFICE
CERTIFICATE OF CORRECTION

PATENT NO. : 5,629,872
DATED : May 13, 1997
INVENTOR(S) : K.C. Grpss et al.

It is certified that error appears in the above-identified patent and that said Letters Patent is hereby corrected as shown below:

On the title page , in the notice line indicated at [*], delete " Pat. No. 5,223,207 " and insert -- Pat. No. 5,459,675 --

Signed and Sealed this

Twenty-fifth Day of May, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,629,872
DATED : May 13, 1997
INVENTOR(S) : K. C. Gross et al

It is certified that error appears in the above-identified patent and that said Letters Patent is hereby corrected as shown below:

On the title page, in the notice line indicated at [*], delete "Pat. No. 5,223,207" and insert -- Pat. No. 5,459,675 --

This certificate supersedes Certificate of Correction issued May 25, 1999.

Signed and Sealed this

Nineteenth Day of October, 1999

Attest:

Q. TODD DICKINSON

*Attesting Officer*  *Acting Commissioner of Patents and Trademarks*